(12) United States Patent
Grandjean et al.

(10) Patent No.: US 8,071,068 B2
(45) Date of Patent: Dec. 6, 2011

(54) PROCESS FOR DESULPHURIZATION OF A GASEOUS EFFLUENT COMPRISING A DEVICE FOR ON-LINE ANALYSIS AND CONTROL

(75) Inventors: Julien Grandjean, Lyons (FR); Laurent Renaudot, Maclas (FR); P-Louis Carrette, Lyons (FR); Sophie Drozdz, Lyons (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 0 days.

(21) Appl. No.: 12/760,752

(22) Filed: Apr. 15, 2010

(65) Prior Publication Data
US 2010/0266483 A1    Oct. 21, 2010

(30) Foreign Application Priority Data
Apr. 16, 2009    (FR) .................................... 09 01863

(51) Int. Cl.
*C01B 17/04*    (2006.01)
(52) U.S. Cl. ............... 423/574.1; 423/DIG. 5; 422/105; 422/108; 422/111

(58) Field of Classification Search ............... 423/574.1, 423/DIG. 5; 422/105, 108, 111
See application file for complete search history.

(56) References Cited

U.S. PATENT DOCUMENTS

| 4,100,266 A | 7/1978 | Smith |
| 4,405,593 A | 9/1983 | Schlauer et al. |
| 4,836,999 A | 6/1989 | Reed et al. |
| 7,250,149 B1 * | 7/2007 | Smith ........................ 423/573.1 |

FOREIGN PATENT DOCUMENTS

| CA | 1 097 890 A1 | 3/1981 |
| JP | 56-44844 A | 4/1981 |

OTHER PUBLICATIONS

Search Report of FR 0901863 (Nov. 20, 2009).

* cited by examiner

*Primary Examiner* — Timothy Vanoy
(74) *Attorney, Agent, or Firm* — Millen, White, Zelano & Branigan, P.C.

(57) ABSTRACT

The invention concerns a process for desulphurization of a gaseous effluent containing hydrogen sulphide using a Claus treatment unit followed by a Claus tail gas treatment unit (TGT), said process comprising using a device for on-line analysis of the ratio $H_2S/SO_2$ at the outlet from the TGT unit and a feed-back loop which can maintain said $H_2S/SO_2$ molar ratio at the outlet from the TGT unit to a value close to 2 and generally in the range 1.5 to 2.5.

6 Claims, 3 Drawing Sheets

PROCESS FOR DESULPHURIZATION OF A GASEOUS EFFLUENT COMPRISING A DEVICE FOR ON-LINE ANALYSIS AND CONTROL

The present invention relates to the field of the treatment of sulphur-containing gas, and more precisely the treatment of gas employing the Claus reaction. More particularly, it pertains to an improved process for the treatment of a gaseous effluent containing hydrogen sulphide, said process allowing the sulphur yield of the Claus line to be maximized and, as a result, enabling a purified gas to be produced that generally contains less than 1% by volume of elemental sulphur, or even less than 0.5% or 0.1% by volume of elemental sulphur.

The present invention may advantageously be used to treat gas deriving from hydrodesulphurization, catalytic cracking or natural gas purification units.

The invention concerns an improved process for desulphurization of a gaseous effluent containing hydrogen sulphide using a Claus treatment unit followed by a Claus tail gas treatment unit (TGT), said process comprising using a device for on-line analysis of the molar ratio $H_2S/SO_2$ (equal to the ratio of the volume percentages of these compounds in the gas phase) at the outlet from the TGT unit and a feed-back loop which can maintain said $H_2S/SO_2$ molar ratio at the outlet from the TGT unit to a value close to 2 and generally in the range 1.5 to 2.5.

PRIOR ART

Various methods can be used to eliminate hydrogen sulphide from a gas to be treated. These methods are described, for example, in patent applications FR-A-2 411 802 and FR-A-2 336 163.

The Claus process is widely employed to recover elemental sulphur from gaseous feeds containing hydrogen sulphide ($H_2S$). However, the fumes emitted by facilities with Claus type units include non-negligible quantities of acid gases, even after several catalytic steps. Thus, it is necessary to treat those effluents or tail gas from Claus units in order to eliminate the majority of the toxic compounds in order to satisfy anti-pollution regulations. Those regulations are growing ever stricter and it is constantly necessary to improve existing technology.

It is known, for example, to recover approximately 95% by weight of elemental sulphur present in the gas to be treated from a Claus unit. A subsequent treatment of the effluent from a Claus unit (by a Clauspol® unit, for example) can, for example, mean that 99.8% by weight of the sulphur can be recovered. The Claus reaction is well known; in a Claus unit, hydrogen sulphide ($H_2S$) reacts with sulphur dioxide ($SO_2$) in accordance with the reaction:

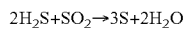

$$2H_2S+SO_2 \rightarrow 3S+2H_2O$$

In order to ensure an optimized sulphur elimination efficiency and to limit the secondary reactions, it is preferable to maintain the $H_2S/SO_2$ molar ratio to as close to 2 as possible in accordance with the stoichiometry of the Claus reaction.

In the case of the Clauspol® reaction, this reaction is carried out in a reaction medium constituted by an organic solvent and a catalyst comprising an alkaline or alkaline-earth salt of an organic acid. The reaction is generally carried out in counter-current mode in a reactor-contactor and its temperature is controlled by the passage of a solvent which has been withdrawn from the lower end of the reactor via a circulating pump into a heat exchanger in order to encourage conversion into sulphur, while avoiding the formation of solid sulphur. Thus, the sulphur is recovered in the liquid form. Although it performs well, the process is limited by various constraints:

the thermodynamic equilibrium of the reaction is such that the reaction is never complete. Hydrogen sulphide and sulphur dioxide remain in equilibrium with the sulphur and the water which are formed. Typically, the quantity of sulphur present as $H_2S$ and $SO_2$ which has not reacted and which is found in the reaction effluent from the tail gas treatment corresponds to approximately 0.2% to 0.5% by weight of the total sulphur for the feed for the Claus unit. A better conversion can be envisaged at a lower operating temperature, but this temperature has to be kept above the freezing point of the sulphur (approximately 120° C.), otherwise the reactor would be clogged with solid sulphur;

the presence of unseparated liquid sulphur in the reactor-contactor, which is entrained in the solvent and the catalyst which are circulating, and which is recycled to the reactor-contactor. Not all of the droplets of liquid sulphur are separated from the solvent and the presence of liquid sulphur irremediably involves the presence of gaseous sulphur in the effluent due to the vapour tension of sulphur. As an example, the quantity of unrecovered sulphur which can be attributed to its vapour tension is approximately 0.1% by weight of the sulphur in the initial feed.

Different processes for tail gas treatment or TGT have been developed since the 1960s, based on the continuation of the Claus reaction at lower temperatures (125-160° C.) over a solid catalyst. Examples are the Sulfreen®, CBA® or MCRC® processes or the Clauspol® process, carried out in the liquid phase.

The effluent from the TGT unit contains residual $H_2S$ and $SO_2$ as well as sulphur vapour at a partial pressure corresponding to the vapour tension at the temperature of the reactor. Other sulphur-containing species formed in the thermal stage of the Claus reaction, and in particular COS and $CS_2$, are also present in residual quantities in the effluent from the TGT unit, after those species have been hydrolyzed to $H_2S$ in the TGT unit. All of that residual sulphur is then transformed into $SO_2$ in the incinerator before being discharged into the atmosphere. Thus, an optimized operation is aimed at reducing the sulphur-containing species sent to the incinerator located downstream of the TGT unit.

Patent JP 56044844 describes a process for the treatment of gas using the Claus reaction in which the operation of the unit is optimized by determining the $H_2S/SO_2$ ratio, this being carried out at the outlet from the Claus type unit. The determination is carried out by on-line analysis by measuring on the one hand the $SO_2$ content of the gas and on the other hand the total quantity of $H_2S$ and $SO_2$ by oxidation of the $H_2S$. A control valve can adjust the flow rate of the gas at the Claus reactor-contactor inlet in order to maintain the $H_2S/SO_2$ ratio at the outlet from the reactor-contactor to a value of 2. Thus, the Claus reaction can be carried out under good conditions since the reactor-contactor functions under stoichiometric conditions. According to the process described in JP 56044844, the sulphur content of the tail gas is still a few percent. That patent does not envisage using a tail gas treatment which can achieve the yields achieved by the process of the invention.

U.S. Pat. No. 4,836,999 combines a Claus type treatment and a tail gas treatment, in which the $H_2S/SO_2$ ratio is measured at the inlet to the TGT unit (or at the outlet from the Claus unit), which means that the quantity of air admitted into the thermal stage of the Claus unit can be adjusted in order to maintain that ratio to as close to 2 as possible. In U.S. Pat. No.

4,405,593, determination of the $H_2S/SO_2$ molar ratio at the outlet from the Claus unit means that the ratio can be kept as close to 2 as possible at the inlet to the TGT unit by adding $H_2S$ or $SO_2$, either to the tail gas or before the last catalytic stage of the Claus unit.

In both preceding cases, the ratio is controlled upstream of the TGT unit. In addition to the $H_2S$ and $SO_2$ species which are present, other sulphur-containing species such as COS and $CS_2$ formed in the Claus unit may be found transiently in significant quantities at the inlet to the TGT unit. Hydrolysis of those species in the TGT unit then releases secondary $H_2S$, producing an excess of $H_2S$ with respect to the optimized stoichiometry, $H_2S/SO_2=2$.

By carrying out the process of the invention, it is possible to improve the efficiency of the TGT unit and, as a result, the overall efficiency of the sulphur recovery line, and thus to substantially improve the purity of the gas, since yields of 99.5% of sulphur, or even 99.8% by weight, may be obtained. The performance as regards sulphur elimination is optimized regardless of the quantities of COS and $CS_2$ since the molar ratio $H_2S/SO_2$ is kept as close to 2 as possible, which means that the Claus reaction can be carried out under optimized conditions throughout the line comprising the Claus unit and the TGT unit.

DESCRIPTION OF THE INVENTION

The invention concerns a process for desulphurization of a gaseous effluent containing hydrogen sulphide using a Claus treatment unit followed by a Claus tail gas treatment unit (TGT), said process comprising using a device for on-line analysis of the ratio $H_2S/SO_2$ at the outlet from the TGT unit and a feed-back loop which can maintain said $H_2S/SO_2$ ratio at the outlet from the TGT unit to a value in the range 1.5 to 2.5. The term "close to 2" means that the molar ratio $H_2S/SO_2$ is adjusted to approximately the value 2, and is generally in the range 1.5 to 2.5, preferably in the range 1.7 to 2.3, more preferably in the range 1.75 to 2.25, or even in the range 1.8 to 2.2.

In the remainder of the description, unless otherwise mentioned, the percentages are expressed by volume (% by volume or vol %) and the ppm (parts per million) are also ppm expressed by volume (ppm or ppm vol). In a Claus unit, hydrogen sulphide reacts with sulphur dioxide. The Claus unit generally contains three stages, the sulphur dioxide being produced, by oxidation of hydrogen sulphide, in a thermal stage operated at a high temperature generally in the range 1000° C. to 2000° C., preferably of the order of 1400° C., the Claus reaction taking place in two catalytic stages where the temperature is generally in the range 150° C. to 300° C., preferably in the range 200° C. to 250° C.

The gas collected at the outlet from the Claus unit still contains hydrogen sulphide and sulphur dioxide in amounts which are still too high to discharge the gas to the atmosphere. Thus, it is necessary to treat the effluent from the Claus unit (tail gas) in a tail gas treatment unit (TGT unit). At the outlet from the TGT unit, for example and preferably a commercially available unit with the trade name Clauspol®, a purified gas is recovered which is then sent to an incinerator before being discharged to the atmosphere.

BRIEF DESCRIPTION OF THE DRAWINGS

A desulphurization process of the invention is described with reference to FIGS. 2 and 3.

DETAILED DESCRIPTION OF THE DRAWINGS

Figure 1:
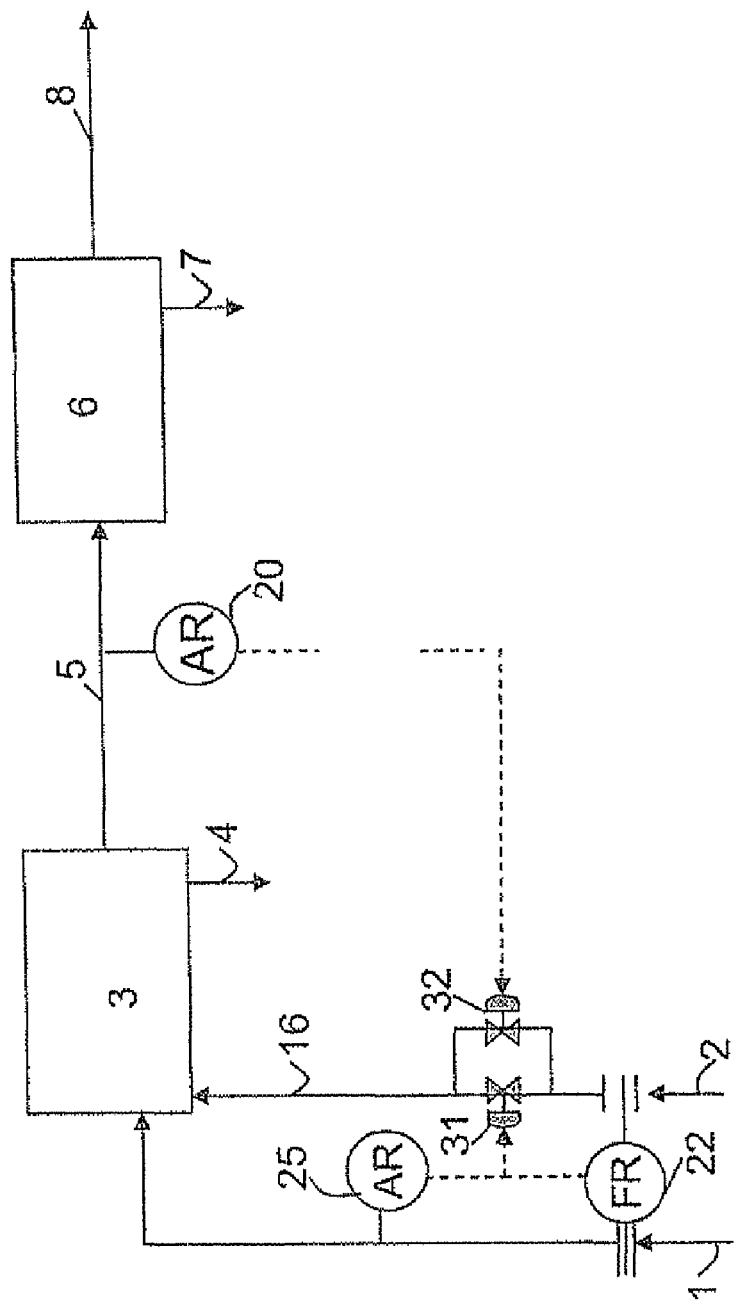
FIG. 1 pertains to the prior art.

According to FIG. 1 (prior art), a gas stream 1 principally containing hydrogen sulphide and which may contain steam, nitrogen and $CO_2$ as well as other impurities such as ammonia and/or hydrocarbons, is sent to a thermal stage of a Claus unit 3. A stream of air supplied via a line 2 is also admitted into the thermal stage of the Claus unit, in order to carry out partial combustion of the hydrogen sulphide to form sulphur dioxide. The thermal stage is generally followed by two or three catalytic stages in which the Claus reaction is continued, and which thus forms part of the Claus unit 3. Liquid sulphur is recovered, after condensation, between the various reactors and is extracted via a line 4. The fraction recovered at the outlet from the Claus unit 3 generally represents 90% to 97% of the sulphur present in the feed to be treated 1 in the form of hydrogen sulphide.

At the outlet from the Claus unit, the tail gas extracted via a line 5 is introduced into a treatment unit (TGT unit) 6. The gas from line 5 generally contains 1% to 2% by volume of $H_2S$ and $SO_2$ and generally contains, in addition, 300 to 1000 ppm by volume of sulphur vapour. The quantity of sulphur in the line 5 is analyzed in terms of the quantities of $H_2S$ and $SO_2$. The on-line analyzer 20 can thus monitor the molar ratio $H_2S/SO_2$. A feed-back loop can maintain this ratio to a value close to 2 and in the range 1.5 to 2.5 by adjusting the secondary air flow regulated by the valve 32. The secondary air flow will supplement the primary air flow regulated by the valve 31, said valve being itself controlled from a measurement of the flow rate of the acid gas and air by the flow rate controller 22 and the on-line analyzer 25 for the concentration of $H_2S$ in the acid gas. At the outlet from the TGT unit 6, a purified gaseous effluent is extracted via a line 8 and the sulphur formed is evacuated via a line 7.

Figure 2:
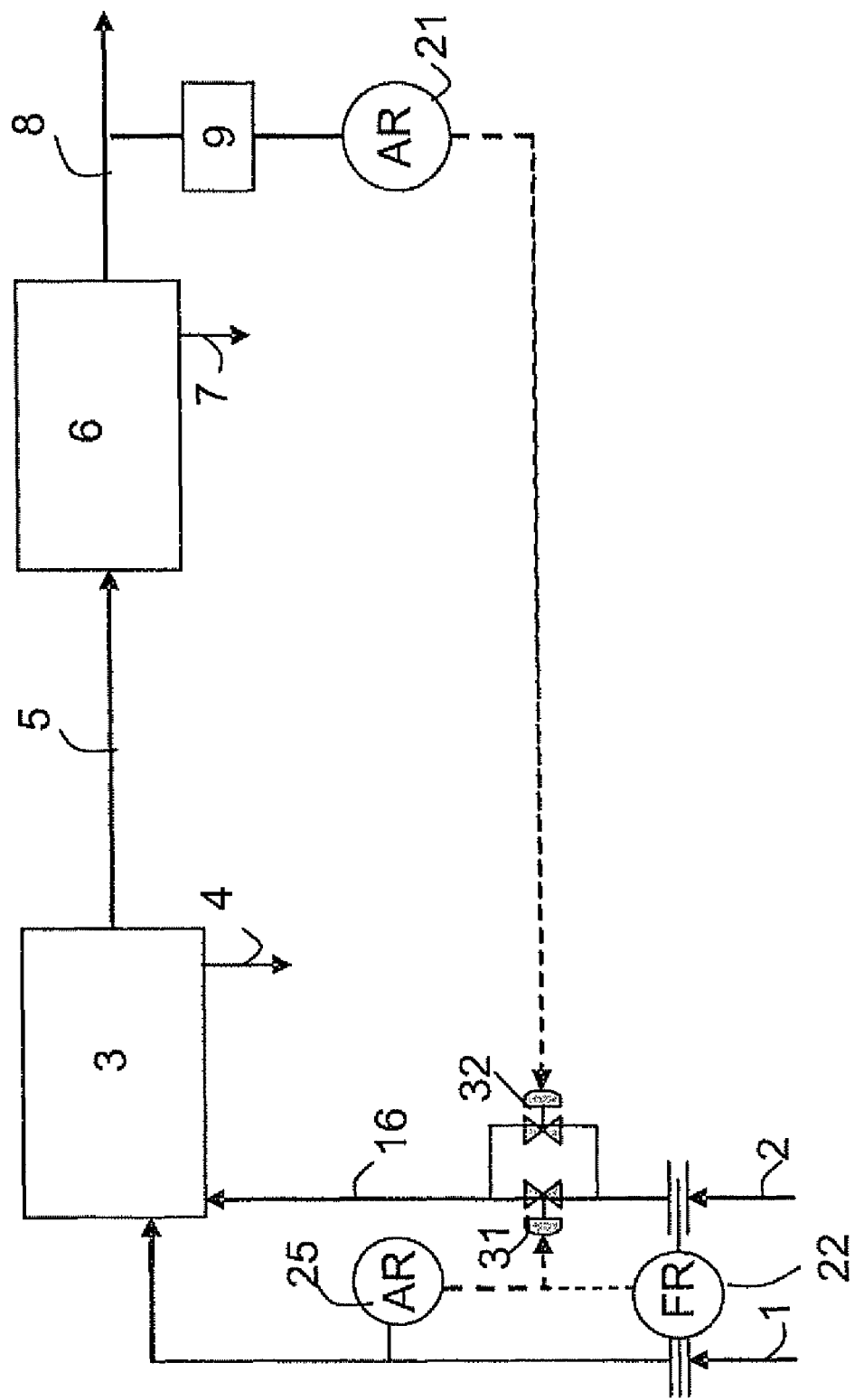

FIG. 2 describes a first implementation of the invention. It uses the elements of FIG. 1, in particular the elements 1 to 8, 16, 22, 25, 31 and 32.

The effluent 8 at the outlet from the TGT unit 6 contains $H_2S$, $SO_2$ and also sulphur vapour as well as COS and $CS_2$ in residual quantities. A portion of this effluent is removed and sent to a sulphur trap 9 then to the on-line analyzer 21. The on-line analyzer 21 disposed at the outlet from the sulphur trap 9 can regulate the valve 32. The sulphur trap 9 comprises a chamber containing a bed of porous solid to allow the majority of the sulphur vapour to condense while preventing condensation of the water contained in the effluent to be analyzed. The effluent removed from the line 8 is maintained at the operating temperature of the reactor-contactor, generally in the range 125° C. to 160° C., until a portion of said effluent is introduced into the sulphur trap chamber. The head of the trap is also maintained at a temperature, generally in the range 125° C. to 160° C., to prevent any solid sulphur from being deposited at the inlet to the trap which would cause it to block up. The bed of solid comprising the porous solid is itself maintained at a temperature in the range 75° C. to 100° C., for example by circulating hot water in a jacket around the chamber.

The bed of porous solid used in the chamber is, for example, constituted by beads or Rashig rings formed from ceramic or alumina, offering a large exchange surface. The gas to be analyzed, depleted in sulphur vapour, is extracted from the chamber via downpipes in the bottom of the chamber, after passage through the bed of porous solid.

According to the invention, the gas to be analyzed contains approximately 15 ppm by volume of sulphur vapour. The analysis is carried out by UV spectrophotometry. $H_2S$ and $SO_2$ have respective absorbances at 228 and 280 nm. Sulphur vapour interferes greatly at these two wavelengths. For a typical composition of a gas at the outlet from the TGT unit, namely 400 ppm by volume of $H_2S$, 200 ppm by volume of $SO_2$, a residual quantity of 15 ppm by volume of sulphur vapour contributes approximately 10% of the total absorbance of sulphur-containing species at the two characteristic wavelengths of $H_2S$ and $SO_2$. This level of interference is comparable to that normally observed for the analysis of tail gas, the quantities of $H_2S$ and $SO_2$ being closer to 1% by volume, and sulphur vapour in the vicinity of 250 ppm by volume.

The sulphur trap 9 of the implementation of FIG. 2 thus renders possible a determination, using an on-line analysis, of the $H_2S/SO_2$ molar ratio at the outlet from the TGT unit and adjustment of the secondary air from a measurement of that ratio. This sulphur trap provides a substantial improvement over the prior art.

In industrial on-line sulphur analyzers, an integrated sulphur trap can eliminate a portion of the sulphur vapour by condensation of sulphur in the liquid state at approximately 115° C. The liquid sulphur is then evacuated continuously under gravity and entrained by the gas stream at the outlet from the heated sampling loop which returns to the removal point. This type of condenser is rendered redundant when using the sulphur trap described above. This trap has two major advantages over the prior art:

Firstly, the reduction in the cold point from 125° C. to 75° C. means that the vapour tension of the sulphur can be reduced from 250 ppm by volume to 15 ppm by volume, which means that the $H_2S$ and $SO_2$ can be analyzed at the outlet from the TGT unit without major interference from sulphur vapour. In fact, at 250 ppm by volume, sulphur vapour represents approximately 70% of the total absorbance of the sulphur-containing species at the wavelengths used for the measurement of $H_2S$ and $SO_2$; this contribution is reduced to 10% of the total absorbance by reducing the concentration of sulphur vapour to 15 ppm by volume.

Secondly, the trapped sulphur accumulates in the trap in the solid form. This configuration of the trap limits the risks of clogging linked to backflow of liquid sulphur into the sampling line up to the withdrawal point.

Figure 3:
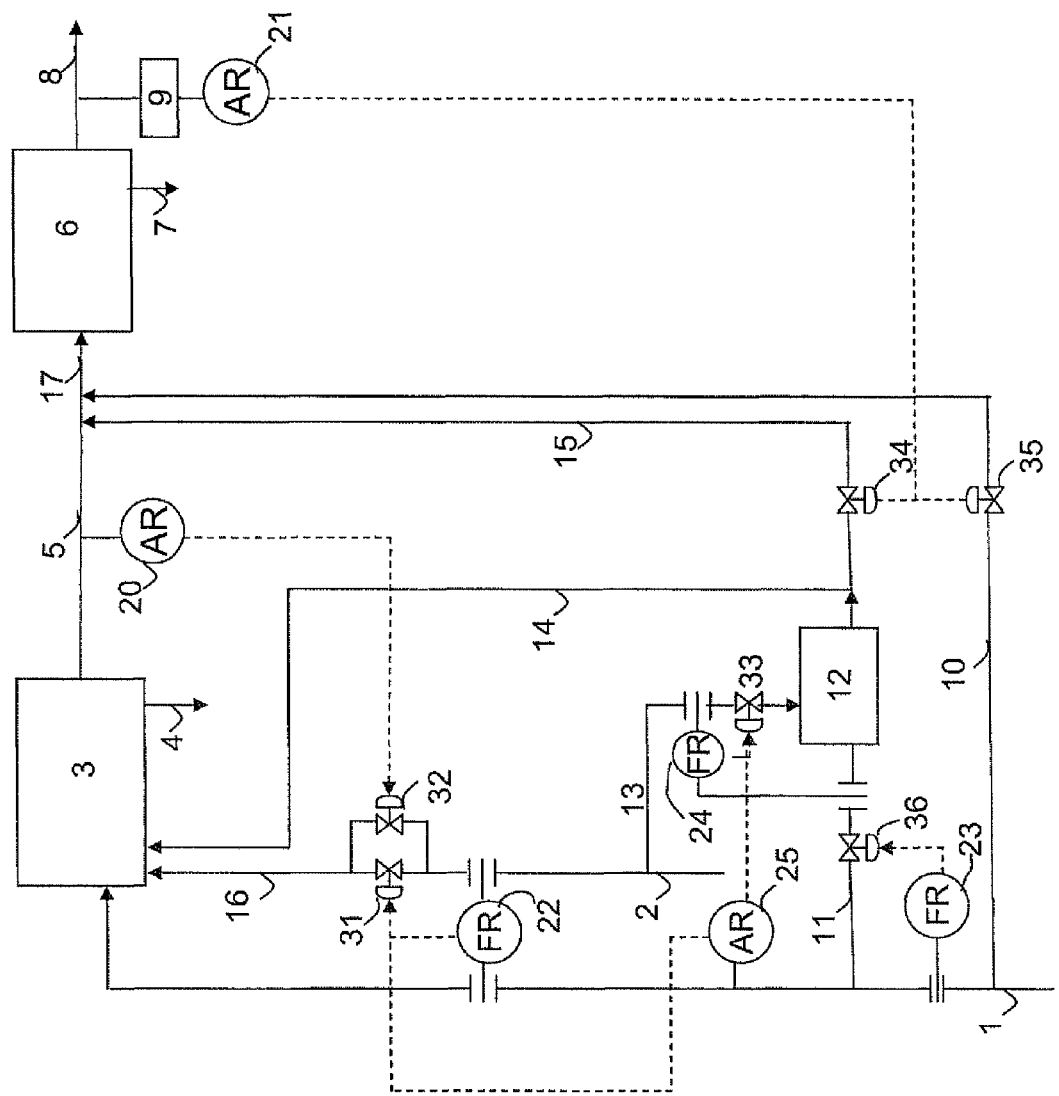

FIG. 3 describes a preferred implementation of the invention. In accordance with this implementation, the ratio $H_2S/SO_2$ is measured both at the outlet from the Claus unit 3 and at the outlet from the TGT unit 6. In this manner, the $H_2S/SO_2$ stoichiometry is monitored to maintain this molar ratio to as close to 2 as possible right through the sulphur line, thereby ensuring optimized sulphur elimination efficiency conditions. FIG. 3 repeats the elements of FIG. 2, in particular the elements 1 to 9, 16, 21, 22, 25, 31 and 32. It also has the analyzer 20 of FIG. 1.

A portion of the gas stream 1 representing approximately 0.5% to 2% of the total flow is sent via the line 11 to a furnace 12 for total oxidation of the $H_2S$ to $SO_2$. The flow rate of the effluent 11 is regulated by the valve 36 in order to represent a fixed fraction of the total flow of the stream 1 measured by the flow controller 23. The flow rate of the air admitted to the furnace 12 via the line 13 is regulated by the valve 33, controlled by the flow controller 24 and the on-line analyzer 25 indicating the concentration of $H_2S$. A portion of the effluent from the furnace 15 can be sent downstream of the Claus unit by opening the valve 34; the remaining portion of the effluent 14 is admitted to the thermal stage of the Claus unit with the stream 1 and the stream of air 2. The on-line analyzer 20 measures the $H_2S/SO_2$ ratio of the effluent 5 at the outlet from the Claus unit, A feed-back loop can maintain this ratio close to a value of 2 by adjusting the secondary air flow regulated by the valve 32. The flow rate of the secondary air flow will supplement the primary flow of air, regulated by the valve 31, this valve itself being controlled from a measurement of the flow rate of the acid gas and air via the flow rate controller 22, and the on-line analyzer 25 for the concentration of $H_2S$ in the acid gas.

The on-line analyzer 21 can determine the value of the $H_2S/SO_2$ ratio of the effluent 8 at the outlet from the TGT unit after passage via the sulphur trap 9. A feed-back loop can maintain this $H_2S/SO_2$ ratio by adjusting the effluents 10 and 15 which are mixing with the effluent from the Claus unit 5; the resulting effluent 17 is sent to the TGT unit 6. The measurement by the analyzer 21 of a molar ratio $H_2S/SO_2$ of more than 2 entrains the opening of the valve 34 and complete closure of the valve 35. Thus, an excess of $SO_2$ is added to the inlet to the TGT unit to re-establish said ratio to a value of close to 2, generally in the range 1.5 to 2.5 at the outlet from the TGT unit. In contrast, a measurement by the analyzer 21 of a $H_2S/SO_2$ ratio of less than 2 causes the opening of the valve 35 and complete closure of the valve 34. Thus, an excess of $H_2S$ is added to the inlet to the TGT unit to re-establish said ratio to a value close to 2 at the outlet from the TGT unit.

A supplemental advantage of the layout of FIG. 3 over that of FIG. 2 is that it maintains an optimized yield right through the line by independently controlling the $H_2S/SO_2$ ratio at the outlet from the Claus and at the outlet from the TGT unit. It is thus possible to maintain a $H_2S/SO_2$ molar ratio of 2±0.5 at the outlet from the TGT unit, guaranteeing an optimized yield for the whole line. Further, it is also possible to keep the ratio at the Claus outlet at a value in the range 1.5 to 2.5, preferably in the range 1.8 to 2.2, or even in the range 1.9 to 2.1 and thus to keep the Claus unit under optimized operational conditions.

In summary:

The invention concerns a process for desulphurization of a gaseous effluent containing hydrogen sulphide using a Claus treatment unit followed by a Claus tail gas treatment unit (TGT), said process comprising using a device for on-line analysis of the ratio $H_2S/SO_2$ at the outlet from said TGT unit and a feed-back loop which can maintain said $H_2S/SO_2$ ratio for the gaseous effluent at the outlet from the TGT unit to a value in the range 1.5 to 2.5.

Preferably, said $H_2S/SO_2$ ratio at the outlet from the TGT unit is kept to a value in the range 1.7 to 2.3.

Preferably, the gaseous effluent from the TGT unit is sent to a sulphur trap.

More preferably, the gaseous effluent at the outlet from the TGT unit is maintained at the operational temperature of the reaction zone of the Claus unit until said gaseous effluent is introduced into the chamber of the sulphur trap, and more preferably said sulphur trap comprises a chamber comprising a bed of porous solid maintained at a temperature in the range 75° C. to 100° C.

In accordance with a preferred implementation of the process of the invention, a gaseous stream 1 principally containing hydrogen sulphide and which may contain steam, nitrogen and $CO_2$ is sent to the thermal stage of a Claus unit 3, a stream of air supplied via a line (2 then 16) is also admitted into the thermal stage of the Claus unit, in order to carry out partial combustion of hydrogen sulphide to form sulphur dioxide; the thermal stage is followed by two or three catalytic stages in which the Claus reaction is continued, and which thus forms part of the Claus unit 3; liquid sulphur is recovered, after condensation, between the various reactors and is extracted via a line 4, at the outlet from the Claus unit, the tail gas extracted via a line 5 is introduced into a treatment unit (TGT unit) 6, the sulphur formed is evacuated via a line 7, a portion of the effluent from the TGT unit 8 is removed and is sent to a sulphur trap 9, then to the on-line analyzer 21; the on-line analyzer 21 can regulate the valve 32; the effluent removed from the line 8 is held at the operational temperature of the reactor-contactor, in the range 125° C. to 160° C., until a portion of said effluent is introduced into the chamber of the sulphur trap; the head of the trap is maintained at a temperature in the range 125° C. to 160° C.; the porous solid is maintained at a temperature in the range 75° C. to 100° C. by circulating hot water in a jacket around the chamber; a feed-back loop can maintain the $H_2S/SO_2$ molar ratio to a value in the range 1.5 to 2.5 by adjusting the secondary flow of air regulated by the valve 32, the secondary flow of air being supplemented by the primary flow of air, regulated by the valve 31, said valve itself being controlled by a measurement of the flow rate of the acid gas and air via the flow rate controller 22 and the on-line analyzer 25 for the concentration of $H_2S$ in the acid gas.

In accordance with a more preferred implementation of the process of the invention, a gas stream 1 principally containing hydrogen sulphide and which may contain steam, nitrogen and $CO_2$ is sent to the thermal stage of a Claus unit 3, a portion of the gaseous effluent 1 representing approximately 0.5% to 2% of the total flow is sent via the line 11 to a furnace 12 for total oxidation of $H_2S$ to $SO_2$; the flow rate of the effluent 11 is regulated by the valve 36 in order to represent a fixed fraction of the total flow of the stream 1 measured by the flow rate controller 23; the flow rate of the air admitted to the furnace 12 via the line 13 is regulated by the valve 33, controlled by the flow rate controller 24 and the on-line analyzer 25 indicating the concentration of $H_2S$; a portion of the effluent from the furnace 15 is sent downstream of the Claus unit by opening the valve 34; the remaining portion of the effluent 14 is admitted to the thermal stage of the Claus unit with the stream 1 and the stream of air (2 then 16); the on-line analyzer 20 measures the $H_2S/SO_2$ ratio of the effluent 5 at the outlet from the Claus unit; a feed-back loop can maintain this ratio to a value of close to 2 by adjusting the secondary flow of air regulated by the valve 32; the secondary flow of air will supplement the primary flow of air regulated by the valve 31, this valve itself being controlled by a measurement of the flow rate of the acid gas and air via the flow rate controller 22, and the on-line analyzer 25 for the concentration of $H_2S$ in the acid gas, the on-line analyzer 21 allowing the value of the $H_2S/SO_2$ ratio of the effluent 8 to be determined at the outlet from the TGT unit after passing via the sulphur trap 9; a feed-back loop allows this $H_2S/SO_2$ ratio to be maintained by adjusting the effluents 10 and 15 which are being mixed with the effluent from the Claus unit 5; the resulting effluent 17 is sent to the TGT unit 6; a measurement by the analyzer 21 of a molar ratio $H_2S/SO_2$ of more than 2 causes the valve 34 to open and the valve 35 to close completely; in contrast, a measurement by the analyzer 21 of a $H_2S/SO_2$ ratio of less than 2 causes the valve 35 to open and the valve 34 to close completely.

Highly preferably, the on-line analysis device for the ratio $H_2S/SO_2$ is a gas chromatograph.

The scope of the invention will be better understood from the following examples.

EXAMPLES

Example 1

Not in Accordance

A gas stream which had been desulphurized in a Claus unit 3 with a sulphur elimination efficiency of 93% was introduced into a TGT unit 6 at a flow rate of 550 kmole/h. This gas stream contained steam (34% by volume), carbon dioxide (4% by volume) as well as sulphur-containing compounds: $H_2S$ (1.2% by volume), $SO_2$ (0.6% by volume), COS (1000 ppm by volume), $CS_2$ (2000 ppm by volume) as well as sulphur vapour (1000 ppm by volume); the complement was constituted by nitrogen.

The Claus unit 3 employed was a unit which is well known to the skilled person. It comprised three stages, including 1 thermal stage and two catalytic stages.

The TGT unit 6 employed was a Clauspol™ unit the operating conditions for which were adapted so that the COS and $CS_2$ compounds were hydrolyzed at 90%.

The determination of the $H_2S/SO_2$ ratio at the outlet from the Claus unit 3 and its regulation to close to a value of 2 by adjusting the flow rate of the air admitted into the thermal stage of the Claus unit (according to the layout of FIG. 1) resulted in a sulphur yield for the TGT unit of 77.1%, i.e. an overall yield for the sulphur line of 98.5% by weight.

Column 1 of Table 1 below summarizes the composition of the gaseous effluent at the inlet to and at the outlet from the TGT unit 6 as well as the sulphur yields obtained.

Example 2

In Accordance with the Invention

The same gas stream derived from a Claus unit 3 as used in Example 1 and the same Clauspol™ unit 6 were used in this example. This example differed from Example 1 in that the layout and the mode for regulating the $H_2S/SO_2$ ratio employed corresponded to FIG. 2.

The determination of the $H_2S/SO_2$ ratio allowing it to be regulated to a value of approximately 2 was carried out at the outlet from the TGT unit 6 after passage of a fraction of the effluent into a sulphur trap 9 the chamber of which comprised a solid constituted by alumina beads maintained at T=85° C., then analyzed by an ultraviolet analyzer 11. Regulating by increasing the flow rate of the air admitted into the thermal stage of the Claus unit (in accordance with the layout of FIG. 2) resulted in a sulphur yield for the TGT unit of 91.8%, i.e. an overall yield for the sulphur line of 99.5% by weight.

Column 2 of Table 1 below summarizes the composition of the gaseous effluent at the inlet to and at the outlet from the TGT unit, as well as the sulphur yields obtained.

Example 3

In Accordance with the Invention

The same gas stream derived from a Claus unit 3 as used in Example 1 and the same Clauspol™ unit 6 were used in this example. This example differed from Example 1 in that the layout and the mode for regulating the $H_2S/SO_2$ ratio employed corresponded to FIG. 3.

The determination of the $H_2S/SO_2$ ratio allowing it to be regulated to a value of approximately 2 was carried out both at the outlet from the Claus unit 3 and at the outlet from the TGT unit 6 after passage of a fraction of the effluent into a sulphur trap 9 the chamber of which comprised a solid constituted by alumina beads maintained at T=85° C., then analyzed by an ultraviolet analyzer 11. Regulating by adding $SO_2$ to the effluent from the Claus unit (in accordance with the layout in FIG. 3) resulted in a sulphur yield for the TGT unit of 93.9%, i.e. an overall yield for the sulphur line of 99.6% by weight.

Column 3 of Table 1 below summarizes the composition of the gaseous effluent at the inlet to and at the outlet from the TGT unit as well as the sulphur yields obtained.

TABLE 1

|  | 1 (not in accordance) | 2 (in accordance with the invention) | 3 (in accordance with the invention) |
|---|---|---|---|
| TGT inlet |  |  |  |
| $H_2S$ (ppm) | 12000 | 7500 | 12000 |
| $SO_2$ (ppm) | 6000 | 6000 | 8250 |
| COS (ppm) | 1000 | 1000 | 1000 |
| $CS_2$ (ppm) | 2000 | 2000 | 2000 |
| Sulphur vapour (ppm) | 1000 | 1000 | 1000 |
| Total sulphur (ppm) | 24000 | 19500 | 26250 |
| $H_2S/SO_2$ ratio | 2 | 1.25 | 1.45 |
| TGT outlet |  |  |  |
| $H_2S$ (ppm) | 4535 | 414 | 418 |
| $SO_2$ (ppm) | 202 | 207 | 209 |
| COS (ppm) | 100 | 100 | 100 |
| $CS_2$ (ppm) | 200 | 200 | 200 |
| Sulphur vapour (ppm) | 470 | 470 | 470 |
| Total sulphur (ppm) | 5507 | 1591 | 1597 |
| $H_2S/SO_2$ ratio | 2.27 | 2.0 | 2.0 |
| TGT yield (wt %) | 77.1 | 91.8 | 93.9 |
| Overall line yield (wt %) | 98.5 | 99.5 | 99.6 |

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding French application No. 09/01863, filed Apr. 16, 2009, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for desulphurization of a gaseous effluent containing hydrogen sulphide using a Claus treatment unit followed by a Claus tail gas treatment unit (TGT), said process comprising using a device for on-line analysis of the ratio $H_2S/SO_2$ at the outlet from said TGT unit and a feed-back loop which can maintain said $H_2S/SO_2$ ratio for the gaseous effluent at the outlet from said TGT unit to a value in the range 1.5 to 2.5, wherein the gaseous effluent from the TGT unit is sent to a sulphur trap comprising a chamber comprising a bed of porous solid maintained at a temperature in the range 75° C. to 100° C.

2. A process according to claim 1, in which the ratio $H_2S/SO_2$ at the outlet from the TGT unit is maintained at a value in the range 1.7 to 2.3.

3. A process according to claim 1, in which the gaseous effluent at the outlet from the TGT unit is maintained at the operational temperature of the reaction zone of the Claus unit until said gaseous effluent is introduced into the chamber of the sulphur trap.

4. A process according to claim 1, in which a gas stream 1 principally containing hydrogen sulphide and which may contain steam, nitrogen and $CO_2$ is sent to the thermal stage of a Claus unit (3), a stream of air supplied via a line (2 then 16) is also admitted into the thermal stage of the Claus unit, in order to carry out partial combustion of the hydrogen sulphide in order to form sulphur dioxide, the thermal stage is followed by two or three catalytic stages in which the Claus reaction is continued, and which thus forms part of the Claus unit (3), liquid sulphur is recovered, after condensation, between the various reactors and is extracted via a line (4) at the outlet from the Claus unit, the tail gas extracted via a line (5) is introduced into a treatment unit (TGT unit) (6), the sulphur formed is evacuated via a line (7), a portion of the effluent from the TGT unit (8) is removed and is sent to a sulphur trap (9) then to the on-line analyzer (21), the on-line analyzer (21) allowing the valve (32) to be regulated, the effluent removed from the line (8) is maintained at the operational temperature of the reactor-contactor, in the range 125° C. to 160° C., until a portion of said effluent is introduced into the chamber of the sulphur trap, the head of the trap is maintained at a temperature in the range 125° C. to 160° C., the porous solid is maintained at a temperature in the range 75° C. to 100° C. by circulating hot water in a jacket around the chamber, a feed-back loop allowing the $H_2S/SO_2$ molar ratio to be maintained at a value in the range 1.5 to 2.5 by adjusting the secondary flow of air regulated by the valve (32), the secondary flow of air will supplement the primary flow of air, regulated by the valve (31), said valve itself being controlled from a measurement of the flow rate of acid gas and air via the flow rate controller (22) and the on-line analyzer (25) for the concentration of $H_2S$ in the acid gas.

5. A process according to claim 1, in which a gas stream (1) principally containing hydrogen sulphide and which may contain steam, nitrogen and $CO_2$ is sent to the thermal stage of a Claus unit (3), a portion of a gaseous effluent (1) representing approximately 0.5% to 2% of the total flow is sent via the line (11) to a furnace (12) for total oxidation of $H_2S$ to $SO_2$, the flow rate of the effluent (11) is regulated by the valve (36) in order to represent a fixed fraction of the total flow rate of the stream (1) measured by the flow rate controller (23), the flow rate of the air admitted to the furnace (12) via the line (13) is regulated by the valve (33) controlled by the flow rate controller (24) and the on-line analyzer (25) indicating the concentration of $H_2S$, a portion of the effluent from the furnace (15) is sent downstream of the Claus unit by opening the valve (34), the remaining portion of the effluent (14) is admitted to the thermal stage of the Claus unit with the stream (1) and the stream of air (2 then 16), the on-line analyzer (20) measures the $H_2S/SO_2$ ratio of the effluent (5) at the outlet from the Claus unit, a feed-back loop allows this ratio to be kept close to a value of 2 by adjusting the flow rate of the secondary air regulated by the valve (32), the flow rate of secondary air will supplement the primary flow of air, regulated by the valve (31), said valve itself being controlled from a measurement of the flow rate of the acid gas and air via the flow rate controller (22) and the on-line analyzer (25) for the concentration of $H_2S$ in the acid gas, the on-line analyzer (21) allows the value of the $H_2S/SO_2$ ratio of the effluent (8) to be determined at the outlet from the TGT unit after passing via the sulphur trap (9), a feed-back loop allowing said $H_2S/SO_2$ ratio to be maintained by adjusting the effluents (10) and (15) which are being mixed with the effluent from the Claus unit (5), the resulting effluent (17) is sent to the TGT unit (6), a measurement by the analyzer (21) of a $H_2S/SO_2$ molar ratio of more than 2 causes opening of the valve (34) and complete closure of the valve (35), and in contrast, a measurement by the analyzer (21) of a $H_2S/SO_2$ ratio of less than 2 causes opening of the valve (35) and complete closure of the valve (34).

6. A process according to claim 1, in which the on-line analysis device for the $H_2S/SO_2$ ratio is a gas chromatograph.

* * * * *